Inventors:
Helmut Moczala
Willi Otzipka
BY Spencer & Kaye
Attorneys

United States Patent Office 3,504,252
Patented Mar. 31, 1970

3,504,252
SPEED-CONTROLLED D.C. MOTOR HAVING A MECHANICAL OR ELECTRICAL COMMUTATOR
Helmut Moczala, Oldenburg, and Willi Otzipka, Berlin, Germany, assignors to Licentia Patent-Verwaltungs-G.m.b.H., Frankfurt am Main, Germany
Filed June 5, 1967, Ser. No. 643,586
Claims priority, application Germany, June 9, 1966, L 53,808
Int. Cl. H02p 7/28
U.S. Cl. 318—138      3 Claims

ABSTRACT OF THE DISCLOSURE

In a direct current motor including a stator having a plurality of stator windings and a permanent-magnet rotor, a current control circuit is coupled to the stator windings for applying direct current thereto, a commutator receptacle is provided for receiving an electronic or mechanical commutator and for electrically connecting the commutator between the current control circuit and the stator windings, an electronic or mechanical commutator is mounted on the commutator receptacle and is electrically connected to the stator windings, and a tachometer circuit is coupled by means of diodes between the stator windings and the current control circuit to control the current applied to the stator windings as a function of the rotor speed, thereby controlling the speed of the motor.

BACKGROUND OF THE INVENTION

The present invention relates to speed-controlled D.C. motors having mechanical or electronic commutators. The conventional method of controlling the speed of D.C. motors with mechanical commutators consists in interrupting the current supply to the exciter coil of the motor by means of a centrifugal switch when a predetermined speed is exceeded. But contacts on a mechanical commutator which receives sliding carbon brushes, as well as contacts on a centrifugal switch are, however, a source for malfunctions for the motor. It has therefore become customary to replace the mechanical commutator with an electronic commutator, in which transistors are connected to the stator coils and in which the conductivity of these transistors is controlled by a high-frequency oscillator. Thus, the inexpensive D.C. motor constructed with a simple mechanical commutator has been replaced by a more expensive D.C. motor with an electronic commutator, which has the advantage of being less susceptible to malfunctions. In spite of this improved motor, however, the requirement for less expensive motors continues, and therefore motors having mechanical commutators must still be manufactured.

SUMMARY OF THE INVENTION

It is the object of the present invention to provide a speed-controlled D.C. motor which will meet the demand for a less expensive motor having a mechanical commutator as well as the demand for a more expensive motor having an electronic commutator. According to the present invention, this object is achieved for a D.C. motor having a permanent-magnet rotor in which a speed-dependent voltage is transmitted from the stator windings via diodes to a tachometer circuit, and wherein the current supply to the stator windings is controlled by a control circuit, by disposing electrical contacts on stationary portions of the motor to which an electronic or mechanical commutator can be connected as a fixed structural element. The advantage of the present invention is that the speed-controlled D.C. motor can have the identical stator and rotor construction for both the electronic or mechanical commutator applications. Only one structural element on the shaft must be exchanged, i.e., the electronic commutator must be replaced with a mechanical commutator or vice versa to complete the desired motor for each case. The exchange of the commutator also includes all elements required for speed control.

DESCRIPTION OF THE PREFERRED EMBODIMENTS

Figure 1:
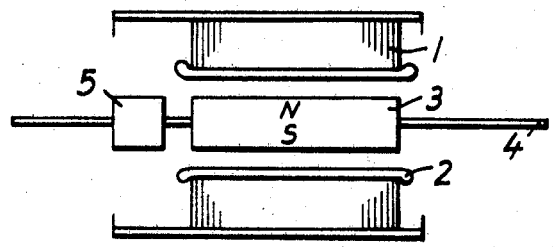
FIGURE 1 is a schematic representation of one basic D.C. motor structure of this invention.
Figure 2:
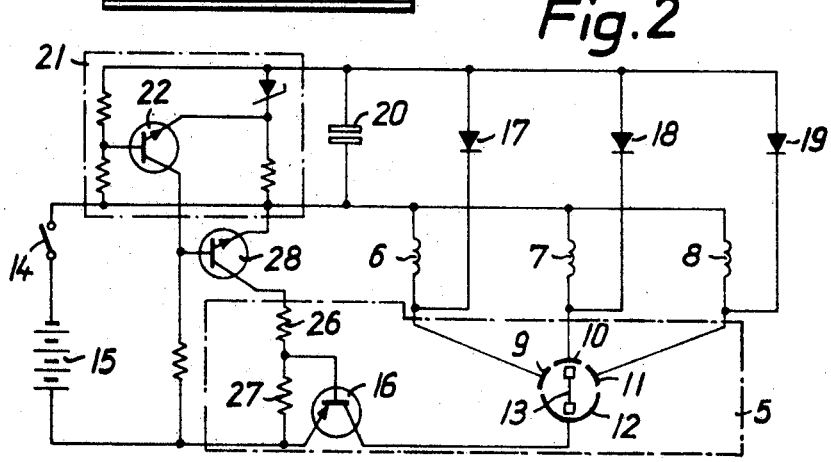
FIGURE 2 is a schematic circuit diagram of a mechanical commutator circuit of this invention.

FIGURE 1 is a schematic representation of a motor in which a permanent-magnet rotor 3 is mounted on a shaft 4 and magnetized transverse to the shaft as indicated by the designation NS. Rotor 3 is mounted for rotation within a stator 1 containing stator windings 2. A commutator 5 is disposed on the shaft 4, which commutator can be either an electronic or a mechanical commutator. The construction of the mechanical commutator is shown in FIGURE 2, while the construction of the electronic commutator can be seen in the FIGURES 4 and 5. In the case of a mechanical commutator, the brushes of the commutator rotate with the rotor of the motor whereas the commutator itself is firmly attached to the stator.

The stator winding 2 is subdivided into three individual stator windings 6, 7, and 8. Referring to FIGURE 2, in which the circuit containing a mechanical commutator is illustrated, the stator windings 6, 7, and 8 are coupled to the commutator sections 9, 10, and 11 of the mechanical commutator. This mechanical commutator is further provided with a fourth section 12 extending over 180°. A brush member 13 which is coupled to the rotor moves over the commutator sections. The motor is fed from the battery 15 after the switch 14 is closed. The emitter-collector path of the control transistor 16 is disposed between the battery and the commutator, the base of transistor 16 being connected to the voltage divider consisting of resistors 26 and 27. The resistor 26 is connected to the negative pole of the battery 15 via the emitter-collector path of an intermediate transistor 28. Diodes 17, 18, and 19 are connected to the stator coils 6, 7, and 8 to transmit the voltage developed in the stator coils to the capacitor 20. The same voltage is also applied to a voltage-dependent bridge circuit 21 in whose zero branch is a control transistor 22 whose collector is connected to the base of the intermediate transistor 28.

The control circuit of FIGURE 2 operates as follows: When the switch 14 is closed, a current can flow from the battery 15 through the stator winding 7 as indicated in FIGURE 2. At this moment, the control transistor 16 is conductive. Because of the torque created by the stator winding 7, the rotor and thus the bush member 13, which is also mounted in the shaft 4, begin to rotate so that after a short period of rotation the one brush of brush member 13 has moved from section 10 to section 11 of the commutator and current flows through stator winding 8. In this way, the motor begins to speed up to a predetermined limiting speed at which the potential applied to the bridge circuit 21 will cause the control transistor 22 to become conductive and thus reduce the current conductivity of intermediate transistor 28 or render the intermediate transistor 28 entirely nonconductive. Thus, the potential of the base of the control transistor 16 is altered to such an extent that its conductivity is reduced; consequently, the stator windings no longer receive the current necessary to maintain their rotational moment, thereby somewhat reducing the speed of rotation. In this way, the motor can be operated at a relatively constant speed.

In the embodiment with a stationary commutator and rotating brushes, it is preferable to utilize a flat commutator. With appropriately precise manufacturing it is, however, also possible to utilize a cylindrical commutator. The stationary commutator sections are preferable because the capacitors and resistors required to eliminate peak voltages and to extinguish sparks can be connected to the commutator sections without slip rings. The present invention is, however, not limited to stationary commutator sections, but can also be applied to rotating commutator sections with fixed brushes if desired.

Figure 3:
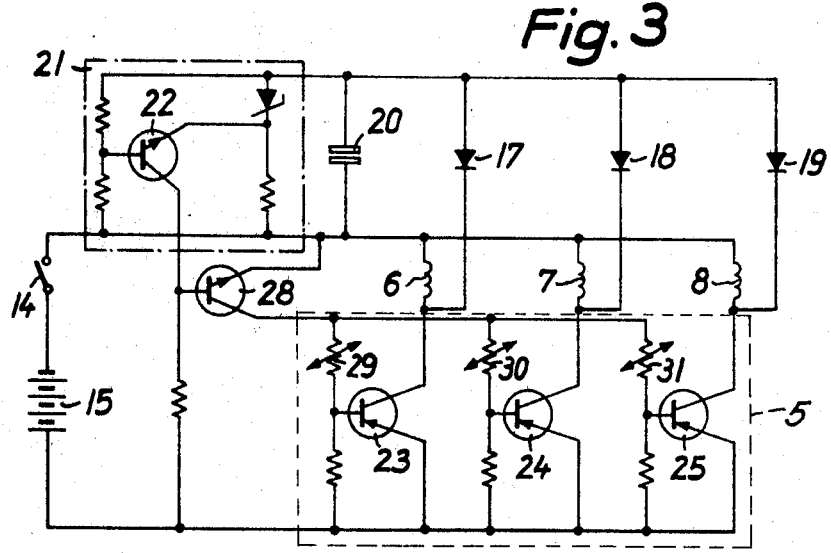
FIGURE 3 is a schematic circuit diagram of an electronic commutator circuit of this invention.

When the electronic commutator circuit 5 illustrated in FIGURE 3 is connected in the circuit of FIGURE 2 in place of the mechanical commutator, the stator windings 6, 7, and 8 are connected to the battery 15 via transistors 23, 24, and 25. The voltage of the stator windings is taken off by diodes 17, 18, and 19 and transmitted to the capacitor 20, whose voltage is applied to the voltage-dependent bridge circuit 21 in whose zero branch the control transistor 22 is disposed. The acceleration of the motor in the circuit employing the commutator of FIGURE 3 is the same as described above for the circuit employing the mechanical commutator of FIGURE 2. Upon reaching the predetermined limiting speed, the control transistor 22 becomes conductive and reduces the conductivity of the intermediate transistor 28, thus reducing the conductivity of the stator transistors 23, 24, and 25, which, in the extreme case, can also become non-conductive. The resistors 29, 30, and 31 are controllable and change their resistance depending on the angular position of the rotor. They can, for example, be resistors whose resistance depends upon a magnetic field such as described in copending U.S. patent application Ser. No. 594,444, which was filed by Willi Otzipwa et al. on Nov. 15, 1966, for Construction of Brushless D.C. Motors.

Figure 4:
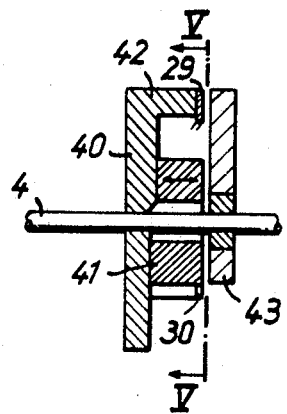
FIGURE 4 is a schematic representation of one basic structure of the electronic commutator.
Figure 5:
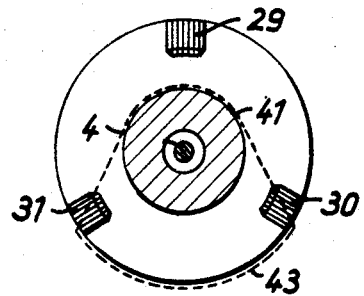
FIGURE 5 is a section through FIGURE 4 along the line V—V.

An example for the structure of an electronic commutator is shown in FIGURES 4 and 5. Arranged on the shaft 4 is a segment member 43 which is made of soft iron. The outline of the segment 43 can best be seen in FIGURE 5.

The control core 40 of the electronic commutator can advantageously be made of sintered metal. In order to mount the resistors 29, 30, and 31 properly on the control core 40, three leg portions 42 are disposed about the control core. The height of the leg portion is substantially the same as the height of the magnet 41 which is arranged coaxially about the shaft 4 of the motor, and which rests with one side thereof against the control core 40. The permanent magnet 41 is axially magnetized as indicated by the arrows.

As can be seen from figure 4, the magnetic circuit about the control core 40 is completed through the soft iron segment 43. Accordingly, the completion of the magnetic circuit depends upon the rotor position.

As indicated above, the resistors 29, 30, and 31 are magnetic field-dependent resistors. They may be made from indium antimonide and are illustrated in the shape of field plates.

It will be understood that the above description of the present invention is susceptible to various modifications, changes, and adaptations, and the same are intended to be comprehended within the meaning and range of equivalents of the appended claims.

What is claimed is:
1. A direct current motor comprising, in combination:
 (a) a stator including a plurality of stator windings;
 (b) a permanent magnet rotor;
 (c) a direct current source;
 (d) electrical contacts and means for selectively receiving either a mechanical or electronic commutator and for electrically connecting the commutator between said direct current source and said stator windings for applying direct current from the direct current source to the individual stator windings in time sequence.

2. A direct current motor as defined in claim 1 wherein said commutator is mechanical and includes a plurality of fixed commutator laminations which are connectable to said stator windings and a brush which is connectable to said rotor and rotatable therewith.

3. A direct current motor as defined in claim 2 wherein said commutator is electronic and includes a plurality of transistors corresponding to the number of stator windings, the collectors of said transistors being connectable to the stator windings, the emitters of said transistors being connectable to said direct current source, and rotary means for switching said transistors on and off in time sequence.

References Cited
UNITED STATES PATENTS

| | | | |
|---|---|---|---|
| 3,242,406 | 3/1966 | Tanaka | 318—138 |
| 3,264,539 | 8/1966 | Sander | 318—327 |
| 3,274,471 | 9/1966 | Moczala | 318—138 |
| 3,304,481 | 2/1967 | Saussele | 318—138 |
| 3,329,852 | 7/1967 | Saussele et al. | 318—138 |
| 3,368,128 | 2/1968 | Parrish | 318—138 |

GLEN R. SIMMONS, Primary Examiner

U.S. Cl. X.R.

310—233; 318—327, 439, 254